(No Model.)  3 Sheets—Sheet 1.
F. A. JONES.
RECORDING PRESSURE GAGE.

No. 345,061.  Patented July 6, 1886.

WITNESSES.  INVENTOR.
Joseph Ishbaugh.  Florentine A. Jones,
J. M. Hartnett.  By his Att'y.
  Henry W. Williams (No Model.) 3 Sheets—Sheet 3.

F. A. JONES.
RECORDING PRESSURE GAGE.

No. 345,061. Patented July 6, 1886.

WITNESSES. INVENTOR.

UNITED STATES PATENT OFFICE.

FLORENTINE A. JONES, OF MALDEN, MASSACHUSETTS.

RECORDING PRESSURE-GAGE.

SPECIFICATION forming part of Letters Patent No. 345,061, dated July 6, 1886.

Application filed March 3, 1884. Serial No. 122,741. (No model.)

*To all whom it may concern:*

Be it known that I, FLORENTINE A. JONES, of Malden, in the county of Middlesex and State of Massachusetts, have invented new and useful Improvements in Recording Pressure-Gages, of which the following is a specification.

This invention relates to gages for recording the extent and variations of pressure in steam-boilers, cylinders, and other vessels containing air, gas, liquid, or other fluids.

The object of the invention is to record the pressure and its variations upon a suitable recording-surface by means of a connecting or reciprocating rod and a recording device which may be operated independently of the gage-movement commonly used in Bourdon spring-gages.

Figure 1:
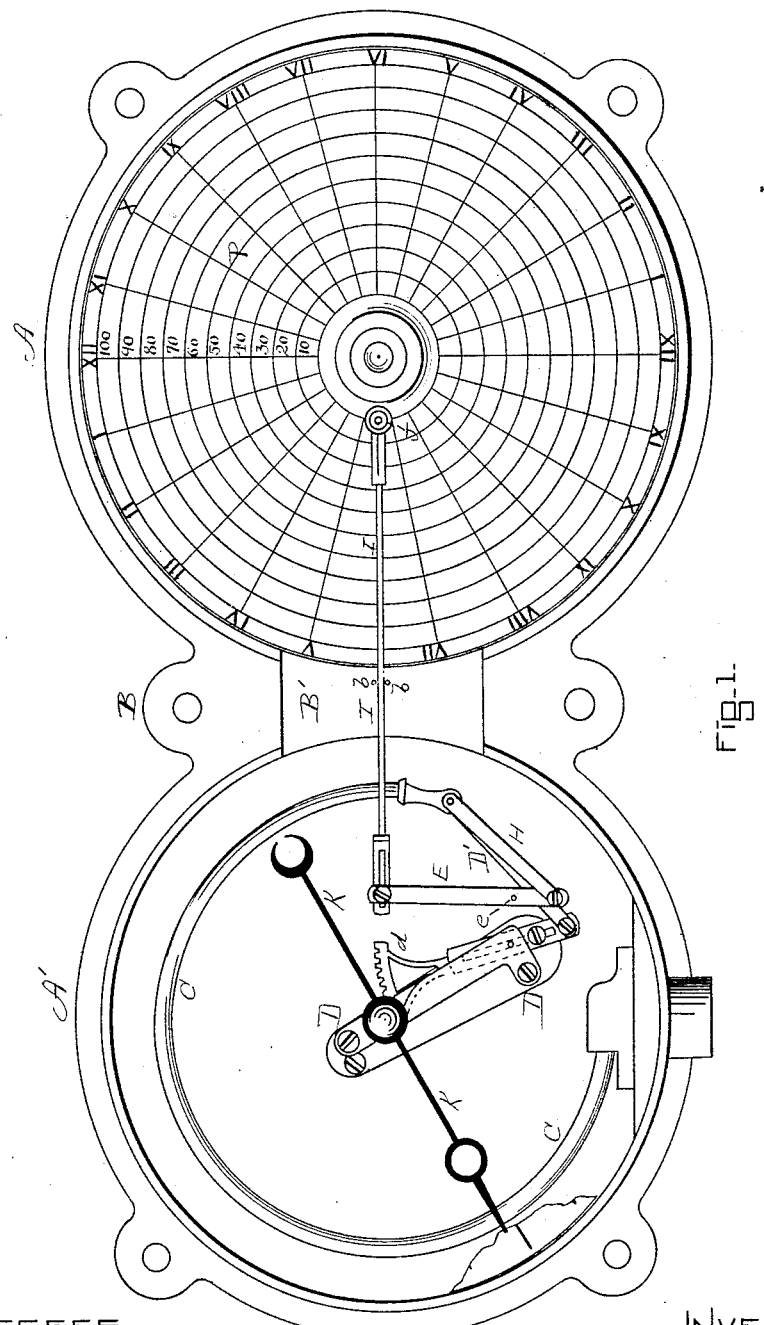
Figure 2:
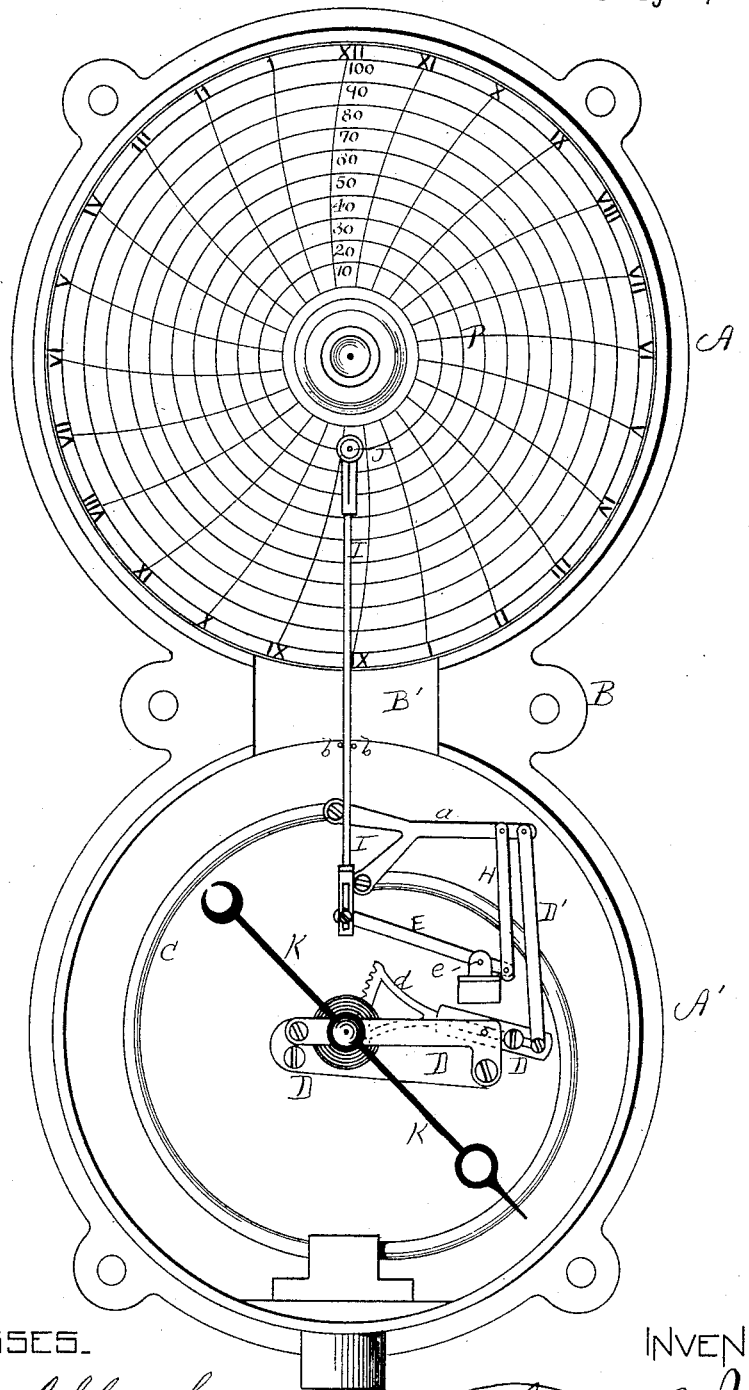
Figure 5:
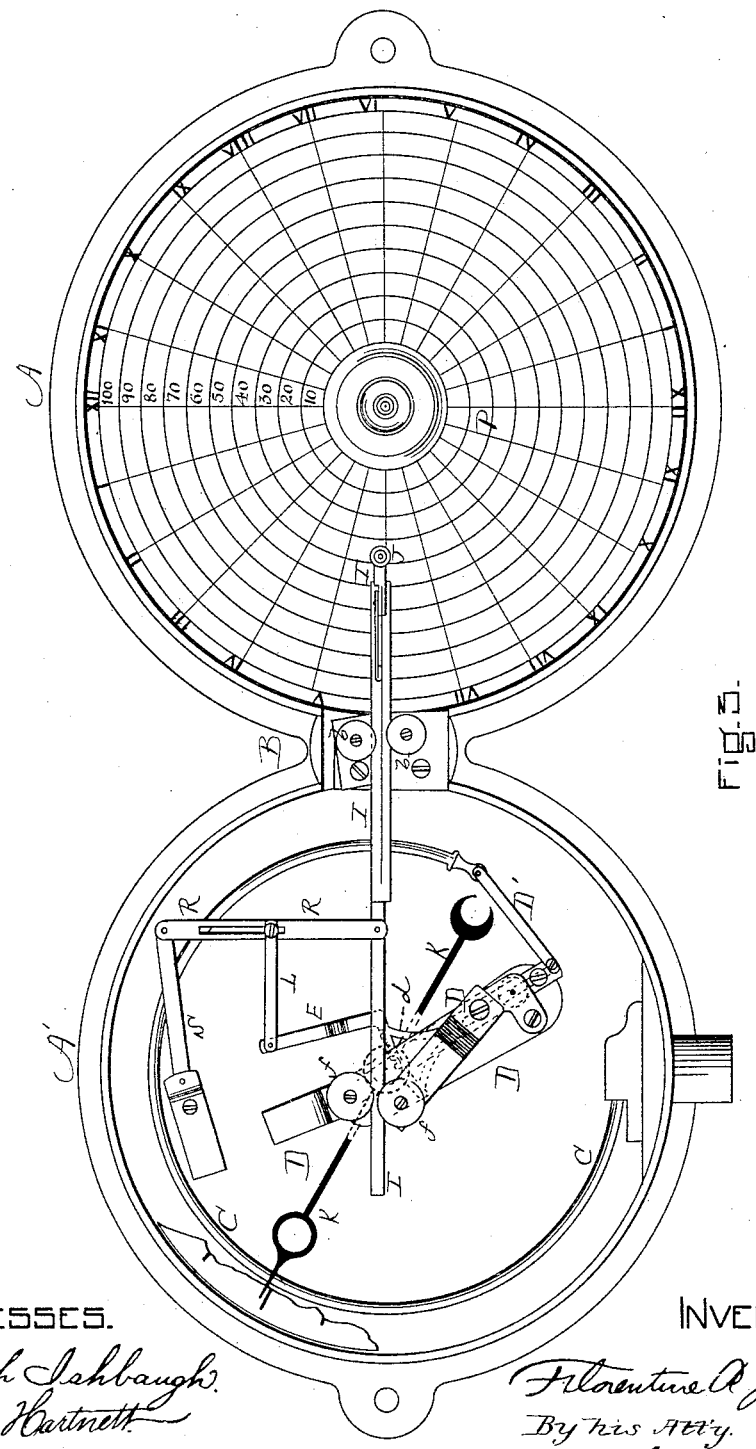

In the accompanying drawings, in which similar letters of reference indicate like parts, Figure 1 is a plan view of a recording pressure-gage embodying my invention, with the steam-pressure dial removed, a single tubular or Bourdon spring being employed. Fig. 2 is a similar view showing the device in connection with a double tubular or Bourdon spring. Fig. 3 is a similar view showing a modification, a single tubular or Bourdon spring being employed.

A and A' are boxes secured to each other by the connection B, which has a suitable passage, B', for the accommodation of the connecting mechanism.

C represents a tubular or Bourdon spring, single in Fig. 1 and double in Fig. 2; and D, the ordinary mechanism of a steam-gage, consisting, essentially, of a segmental rack, d, pivoted near its rear end, and meshing into a pinion carrying the pointer K. The pinion is not shown in the drawings.

D' is a link which, when a single spring is used, connects the mechanism D therewith, and when a double spring is used, as in Fig. 2, connects said mechanism with the bifurcated projection a, secured to the ends of said spring, whereby movement is imparted to the pointer K, thus showing in connection with the dial the steam-pressure.

In Fig. 1, E is a multiplying-lever, pivoted at e to the box A, and having its short arm loosely connected by a link, H, with the end of the Bourdon spring C. Its long or multiplying arm is adjustably connected with the longitudinally-reciprocating rod I, extending to the recording-dial P, and operating a delineating device, J, whereby the extent and variations of pressure are recorded on said dial P, rotated by clock-work in the ordinary manner. Guides b are placed as shown to prevent lateral movement of the connecting-rod I.

In Fig. 2 the multiplying-lever E is pivoted at c, and has its short arm connected by a link, H, to the bifurcated rod a, and its long arm adjustably connected, as in Fig. 1, with the reciprocating connecting-rod I.

In the modification shown in Fig. 3 the multiplying-lever E is rigidly secured to the end of the rack d, and is loosely connected by a link, L, with the lever R, one end of which is pivoted to a rod, S, (whose other end is pivotally secured to the box A,) and the other end is pivoted to the reciprocating connecting-rod I, which in this case requires, in addition to the rollers b, another set of guiding-rollers f.

In all the figures of the drawings it will be observed that I show a longitudinally-reciprocating connecting-rod for operating the recording device, actuated by a multiplying-lever which is connected directly or indirectly with the steam-pressure mechanism or the tubular or Bourdon spring, but is additional to both.

Having thus fully described my invention, what I claim, and desire to secure by Letters Patent, is—

In a recording pressure-gage operated by a Bourdon spring or springs, the combination of the following elements, viz: a tubular Bourdon spring or springs and suitable connecting mechanism, a multiplying-lever additional to or independent of the gage mechanism, a reciprocating rod suitably connected with said multiplying-lever, a recording device operated by said rod, and a suitable surface for receiving the record and extent of the variations of pressure, substantially as and for the purpose set forth.

FLORENTINE A. JONES.

Witnesses:
 HENRY W. WILLIAMS,
 JOSEPH ISHBAUGH.